United States Patent [19]

Laven

[11] 4,375,299
[45] Mar. 1, 1983

[54] AQUATIC WEEDER

[76] Inventor: Philip E. Laven, 2662 Sharon, SW., Wyoming, Mich. 49509

[21] Appl. No.: 229,333

[22] Filed: Jan. 29, 1981

Related U.S. Application Data

[63] Continuation-in-part of Ser. No. 971,984, Sep. 4, 1979, abandoned.

[51] Int. Cl.³ .............................................. A47F 13/06
[52] U.S. Cl. .................................. 294/19 R; 30/318; 172/376
[58] Field of Search .............. 294/19 R, 1 R, 49, 53.5; 30/279, 300, 309, 310, 318; 172/371, 376, 377

[56] References Cited

U.S. PATENT DOCUMENTS 1,878,689  9/1932  Flack ..................................... 30/318
3,002,319 10/1961  Laughlin ............................... 30/318
4,093,031  6/1978  Portz ..................................... 173/376

Primary Examiner—James B. Marbert
Attorney, Agent, or Firm—Waters, Lesniak & Willey

[57] ABSTRACT

An aquatic weeder is provided which includes an elongated handle with a generally rectangular, flat blade assembly rigidly mounted at the lower end thereof. The weeder includes a pair of support straps extending from the handle to each end of the blade assembly. The blade assembly includes a flat rectangular cutting blade sandwiched between a pair of rigid generally rectangular support plates. The aquatic weeder is useful for cutting and pulling weed growth from the underwater soil surface just above the root tops to leave the underwater area growth free.

4 Claims, 4 Drawing Figures

AQUATIC WEEDER

CROSS REFERENCE TO RELATED APPLICATION

This application is a continuation-in-part of applicant's co-pending application Ser. No. 971,984, filed Sept. 4, 1979, now abandoned.

BACKGROUND OF THE INVENTION

1. Field of the Invention

The present invention relates to weeding tools, and, more particularly, to an aquatic weeder for cutting and pulling weed growth from the underwater soil surface.

2. Description of the Prior Art

A wide variety of weeding tools and various weed cutting instruments have been in use throughout the years. However, the vast majority of hand-operated weed cutting tools and instruments have been designed to remove weeds from a dry land environment. Thus, many of these hand-operated weed cutting tools are in the form of sickles and the like designed to be swung from side to side in front of the operator in an arc to affect the cutting of the weeds. While very effective in removal of weeds in these applications, these implements are ineffective for use in removing aquatic weed growth. Although excessive underwater weed growth has been a constant problem to lakefront owners, aside from heavy duty and complex dredging types of equipment or the use of heavy chains strung between a pair of boats and the like, there has not been provided heretofore a simple and effective hand-operated aquatic weeder which can be conveniently used by a single operator to remove the unwanted weeds below the water surface.

SUMMARY OF THE INVENTION

The present invention provides an aquatic weeder which is simple and effective and which is easily operated by a single operator. The aquatic weeder of the present invention comprises an elongated handle with a generally rectangular, flat blade assembly rigidly mounted at the lower end of the handle. The axis of the handle is preferably at an angle of about thirty degrees above the minor axis of the blade assembly and generally perpendicular to the major axis of the blade assembly. A pair of rigid support straps are provided with one end of each of the straps being rigidly attached to the handle and the other end of one of the straps being rigidly attached to one end of the blade assembly and the other end of the other strap being rigidly attached to the other end of the blade assembly.

The blade assembly comprises a generally rectangular, flat cutting blade sandwiched between a pair of rigid generally rectangular support plates. The width of the plates is less than the width of the blade so that the blade edge extends beyond the plates at both sides of the plates.

Preferably, the blade is made of steel with a thickness of from about 0.005 to about 0.020 of an inch, and the blade is sandwiched between the plates by a plurality of removable fasteners positioned through a plurality of aligned holes through the blade and the plates so that the blade assembly is easily disassembled to change the blade. In addition, to facilitate easy disassembly for transporting or storing the aquatic weeder, the blade assembly is mounted to the handle and the straps are attached to the handle and the blade assembly by removable fasteners.

BRIEF DESCRIPTION OF THE DRAWINGS

FIG. 1 is a perspective view of the aquatic weeder of the present invention;

FIG. 2 is an exploded view of the aquatic weeder;

FIG. 3 is a side-elevational view of the aquatic weeder; and

FIG. 4 is a cross-sectional view of the blade assembly of the aquatic weeder taken along the line IV-IV of FIG. 1

DESCRIPTION OF THE PREFERRED EMBODIMENTS

Figures 1, 2, 3, 4:
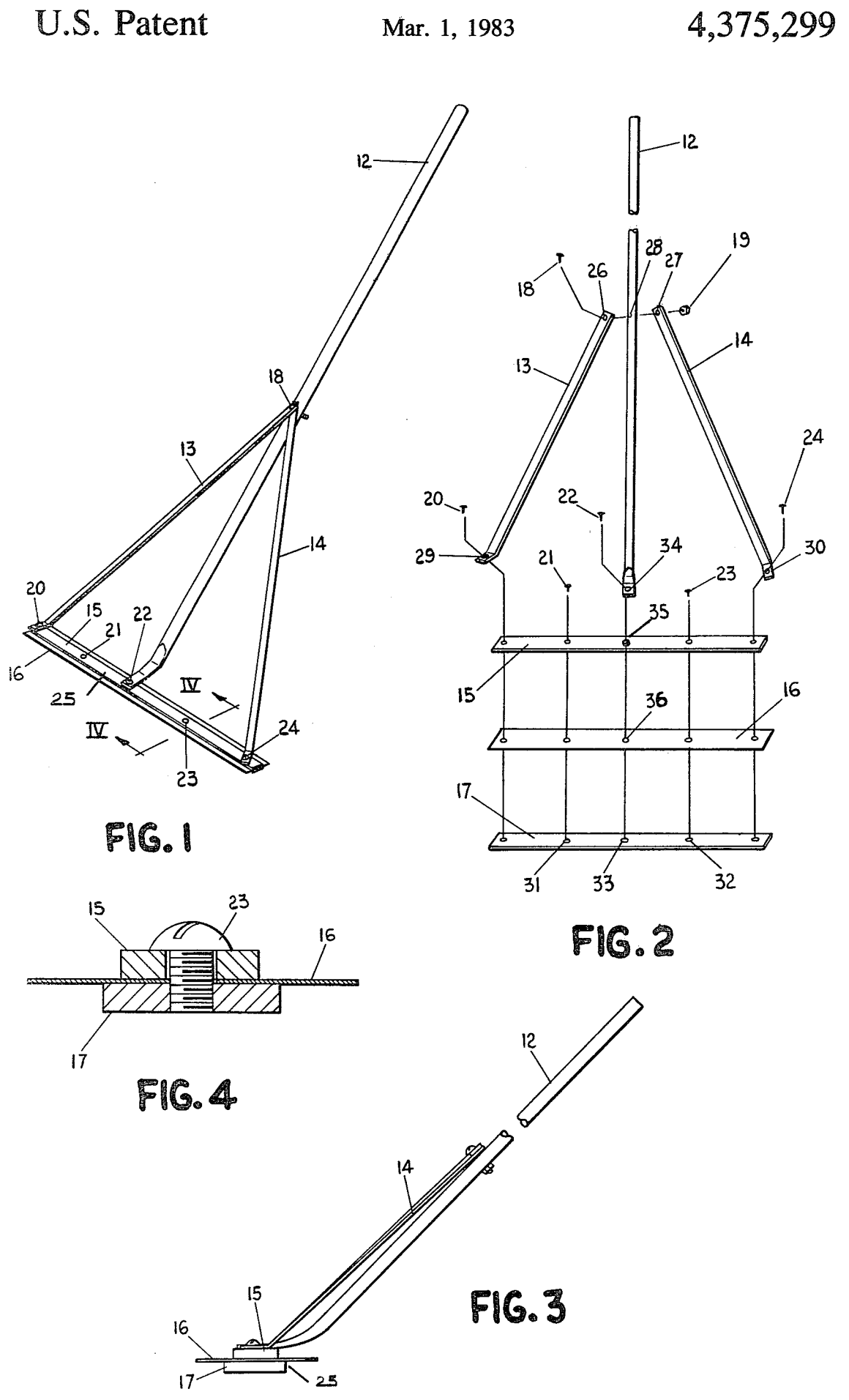

Referring now to the drawings in greater detail, FIG. 1 is a perspective view of the aquatic weeder of the present invention. Handle 12, which is preferably made of a tubular, rustless material such as galvanized or stainless steel, is rigidly attached to blade assembly 25. As best shown in FIG. 3, handle 12 is preferably mounted at an angle approximately thirty degrees above the minor axis of blade assembly 25. The preferred method of attaching handle 12 to blade assembly 25 is by means of a screw 22 which passes through a hole 34 in the end of handle 12, through an aligned hole 35 in support plate 15 and an aligned hole 36 in blade 16 into an aligned threaded hole 33 in support plate 17.

The blade assembly, which comprises blade 16 sandwiched between upper support plate 15 and lower support plate 17, is held together by removable fasteners such as screws 21 and 23 as shown in FIG. 4, as well as by handle screw 22 and strap screws 20 and 24. Support plates 15 and 17 are preferably steel plates with a rust preventitive treatment, and the optimum size has been found to be approximately thirty inches long by three quarters of an inch wide and one eighth of an inch thick. This provides for about a half an inch of exposure of blade 16 as a cutting edge on each side of the blade assembly. As shown in FIG. 2, there are five aligned holes in each of plate 15 and blade 16 and five corresponding threaded holes in plate 17 to receive screws 20, 21, 22, 23 and 24. For better support, it has been found that plate 17 should be slightly wider than plate 15, with a one inch width being especially preferred.

Blade 16 is preferably a hard piece of spring steel or shim stock approximately thirty inches long and two inches wide and can be of various thicknesses depending upon the application. For sparse or thin weed growth, a thin blade on the order of about 0.005 of an inch thick is most effective. Where the weed growth is thick and heavy, blade 16 should be approximately 0.020 of an inch thick.

Support straps 13 and 14 are provided to strenthen the weeder. Preferably, the support straps are made of steel with a rust preventitive treatment and are about thirty inches long, three quarters of an inch wide, and approximately an eighth of an inch thick. Each of straps 13 and 14 has a mounting hole in one end thereof, holes 26 and 27, respectively, which are aligned with hole 28 in handle 12. A screw is passed through holes 26 and 27 and then through hole 28 and is fastened with a nut 19. The opposite ends of straps 13 and 14 have holes 29 and 30, respectively, which are aligned with holes in the blade assembly for mounting thereto by means of screws 20 and 24, respectively. The ends of straps 13 and 14 mounted to the blade assembly should have a bend at the ends thereof of approximately thirty degrees to maintain the angular relationship of handle 12 to blade assembly 15 to facilitate most efficient use of the aquatic weeder.

In assembling the weeder of the present invention, blade 16 is placed on top of bottom plate 17 with the mounting holes aligned. Plate 15 is then placed on top of blade 16 and screws 21 and 23 are passed through the aligned holes and screwed into threaded holes 31 and 32 of plate 17. Handle 12 is then attached to blade assembly 25 by passing screw 22 through hole 34 in handle 12, hole 35 in plate 15, hole 36 in blade 16, and then screwing it into threaded hole 33 in plate 17. Straps 13 and 14 are then attached to handle 12 by passing screw 18 through hole 26 of strap 13, hole 27 of strap 14, and hole 28 of handle 12, followed by securing screw 18 with nut 19. The opposite ends of support straps 13 and 14 are then secured to the blade assembly by means of screws 20 and 24, respectively, being passed through holes 29 of strap 13 and 30 of strap 14 and the corresponding aligned holes of blade assembly 25 in a manner similar to which handle 12 is attached.

In use, the operator moves the weeder along the lake bottom with firm back and forth movements of strokes of approximately three to five feet each. This movement causes the weeder to catch the weed growth at the root top level and cut and pull the growth, thus dislodging it and leaving a growth-free area. Because of the ease of assembly and disassembly of the weeder, the operator can quickly and easily change blades either because of a need for a thicker blade for heavier weed growth or because of evidence of wear which would require blade replacement.

Although the preferred embodiments of the present invention have been described and illustrated, it will be obvious to those skilled in the art that various modifications and changes may be made without departing from the spirit of the present invention. Accordingly, the scope of the present invention is deemed to be limited only by the appended claims.

The embodiments of the invention in which an exclusive property or privilege is claimed are defined as follows:

1. An aquatic weeder for removing weeds from a lake or other body of water comprising an elongated handle and a generally flat elongated blade assembly rigidly mounted transversely to the handle at one end thereof, the axis of said handle being at an angle of about thirty degrees above the minor axis of said blade assembly and generally perpendicular to the major axis of said blade assembly, the blade assembly having exposed cutting edges facing forwardly and rearwardly such that weeds are removed from a lake bottom by sliding the blade assembly in a forward and backward direction along the lake bottom, the blade assembly being mounted at an inclined angle with respect to the handle such that when the handle is held in an inclined position by an operator and the blade assembly is moved forward and backward along the lake bottom to cut weeds located in front of the operator, the blade assembly will lie flat against the lake bottom and will slide along the lake bottom in a direction parallel to the lake bottom;

a pair of rigid support straps, one end of each said strap being rigidly attached to said handle and the other end of one of said straps being rigidly attached to one end of said blade assembly and the other end of the other strap being rigidly attached to the other end of said blade assembly; and said blade assembly comprising a generally rectangular, flat cutting blade sandwiched between a pair of rigid, generally rectangular support plates, the width of said plates being less than the width of said blade so that the blade edge extends beyond the plates at both the forward and rearward sides of said plates.

2. An aquatic weeder according to claim 1 wherein said blade is steel with a thickness of from about 0.005 to about 0.020 of an inch and wherein said blade is sandwiched between said plates by a plurality of removable fasteners positioned through a plurality of aligned holes through said blade and said plates, whereby said blade assembly is easily disassembled to change the blade.

3. An aquatic weeder according to claim 2 wherein said blade assembly is mounted to said handle and said straps are attached to said handle and said blade assembly by removable fasteners whereby the entire weeder can be easily disassembled for transporting or storage.

4. An aquatic weeder according to claim 1 wherein the plate positioned below the blade is wider than the plate above the blade, thereby enhancing the performance of the weeder.

* * * * *